(12) United States Patent
Gerhardt et al.

(10) Patent No.: US 6,551,391 B1
(45) Date of Patent: Apr. 22, 2003

(54) AQUEOUS INK AND USE THEREOF

(75) Inventors: Thomas Gerhardt, Berlin (DE);
Wolfgang Pekruhn, Berlin (DE);
Georges Roussos, Cupertino, CA (US)

(73) Assignee: Francotyp-Postalia AG & Co.,
Birkenwerder (DE)

( * ) Notice: Subject to any disclaimer, the term of this patent is extended or adjusted under 35 U.S.C. 154(b) by 4 days.

(21) Appl. No.: 09/624,454

(22) Filed: Jul. 24, 2000

(30) Foreign Application Priority Data

Jul. 22, 1999 (DE) .......................... 199 33 889

(51) Int. Cl.⁷ .............................. C09D 11/02
(52) U.S. Cl. ................................. 106/31.58
(58) Field of Search .................... 106/31.58

(56) References Cited

U.S. PATENT DOCUMENTS

| 5,106,416 A | 4/1992 | Moffat et al. | |
|---|---|---|---|
| 5,674,314 A | 10/1997 | Auslander et al. | |
| 5,681,381 A | 10/1997 | Auslander et al. | |
| 5,792,249 A | * 8/1998 | Shirota et al. | 106/31.27 |
| 6,231,653 B1 | * 5/2001 | Lavery et al. | 106/31.36 |
| 6,261,353 B1 | * 7/2001 | Doi et al. | 106/31.6 |

FOREIGN PATENT DOCUMENTS

EP 692 20 707 6/1997

OTHER PUBLICATIONS

US 5,630,867, 5/1997, Higashiyama (withdrawn)

* cited by examiner

Primary Examiner—Mark L. Bell
Assistant Examiner—Veronica F. Faison
(74) Attorney, Agent, or Firm—Schiff Hardin & Waite

(57) ABSTRACT

The present invention includes an aqueous ink that has a composition which contains one or more dyestuffs, at least one alkanol with a straight or branched $C_3$–$C_8$-alkyl chain and between two and four hydroxyl groups, at least one $C_1$–$C_6$-alkyl ester of an -hydroxycarboxylic acid of the formula R—C(OH)—COOH, wherein R is H or a straight or branched $C_1$–$C_6$-alkyl residue of a penetration agent, a surfactant, other adjuvants, and wherein the balance of the composition is water.

21 Claims, 5 Drawing Sheets

A = Ethyl lactate/water on reference paper
B = Ethyl lactate/water on cardboard
C = Diethylene glycol monobutyl ether/water on reference paper
D = Diethylene glycol monobutyl ether/water on cardboard A = 50% of pentane-1,5-diol & between 0% and 20% of methyl lactate & difference to 100% water
B = 50% of pentane-1,5-diol & between 0% and 20% of ethyl lactate & difference to 100% water
C = 50% of pentane-1,5-diol & between 0% and 20% of isopropyl lactate & difference to 100% water
D = 50% of pentane-1,5-diol & between 0% and 20% of n-butyl lactate & difference to 100% water Original SCAN  100% Contrast
(Photoshop 5.0)

Assessment: + (GOOD)

Assessment: o (ADEQUATE)

Assessment: - (INADEQUATE)

Resolution ok = 1    Resolution inadequate = 6

AQUEOUS INK AND USE THEREOF

BACKGROUND OF THE INVENTION

1. Field of the Invention

The invention concerns aqueous ink and use thereof.

2. Description of the Related Art

Aqueous inks are used in ink jet printing or color jet printing, in which droplets of an ink or coloring agent are applied to the paper which is to be printed upon. For that purpose it is possible to use either a liquid ink in which the dyestuff or dyestuffs are dissolved in a solvent or coloring agent which is solid at ambient temperature and which is melted thereon. To produce the printed image in droplet form the liquid ink is metered and deflected by electrostatic or magnetic fields or piezoelectric forces. Thus for example in the piezoelectric art, the droplets are produced by piezoelectric forces. In the bubble jet art the droplets are deflected on to the paper by the pressure which occurs upon vaporization of the solvent.

The inks used in such systems must penetrate immediately into the material to be printed upon (such penetration is also referred to as ink absorption), in order that it is not smeared. That is achieved by virtue of the choice of solvents. Normally inks contain a solvent mixture of solvents with various properties to achieve desired effects. Those solvents must be compatible with each other, in other words, they should be soluble or emulsifiable in the basic solvent, so that no phase separation effect occurs. If for ecological and economic reasons water is the solvent of choice, the other solvents used must be water-soluble or emulsifiable. So that the ink is rapidly absorbed by the material to which the printing is to be applied, the ink contains a penetration agent which accelerates the penetration effect. If the time which a given amount of solvent, for example water, requires to penetrate into a substrate is plotted in a chart in dependence on the amount of penetration agent, that gives a curve with a minimum for the penetration time, which is referred to as $t_{min}$. In order to achieve that minimum penetration time, the requirement is for a minimum amount of a penetration agent, which is referred to as the limit concentration. The smaller the value of $t_{min}$ and the lower the limit concentration, the correspondingly more advantageous is the penetration agent in question.

The minimum penetration time is influenced by other constituents which are present in the composition, in particular by the other solvents present. For example inks usually contain in the solvent mixture one or more constituents that have a high boiling point and which are intended to prevent the ink from drying up at the nozzles and causing nozzle encrustation. This high-boiling point solvent which, as discussed above, must be compatible with the basic solvent, and therefore, water-soluble or emulsifiable for aqueous inks, modifies the penetration characteristics of the ink, in other words the limit concentration becomes lower but the penetration times become longer, more specifically, to an increasing degree, the more the high-boiling solvent is polar and thus water-soluble.

With rising polarity, however, the penetration capability of the ink falls as that depends inter alia on the wetting capability in relation to the material to be printed thereon and nonpolar solvents. For example, benzene can wet a paper surface better than polar solvents, such as, water. It is therefore necessary to find a high-boiling solvent which on the one hand is sufficiently polar for it to be water-soluble, while on the other hand it does not excessively impede penetration.

The known aqueous inks often use a solvent mixture that includes glycol as a high-boiling gent and a glycolether as a penetration promoter. Those known ink formulations, however, suffer from the disadvantage that, in relation to many kinds of paper, for example when using recycled paper and slightly sized paper, they cause the ink to run severely in terms of width and they cause the ink to fray out along the paper fibers (also referred to as staining or feathering) which has an adverse effect on the print image.

A further disadvantage of these known ink formulations is that they give characters of poor contrast as the major part of the dyestuff is transported into the paper by the solvent and for that reason only a very small part of the dyestuff remains visibly at the surface of the paper. These known inks are therefore less suitable for printing characters and barcodes which are to be machine-readable.

An area of use in which machine-readability and, because of the high through-put rate, short penetration times are important factors, is the field of franking machines. Franking machine systems are primarily operated with red or red-fluorescing inks, by virtue of the postal regulations. They also did not need to be machine-readable. When using fluorescent inks, the only check was to ascertain whether a red fluorescence of between 580 and 640 nm is to be detected, with an excitation wavelength of 254 nm.

In the course of automation, more powerful technology is now being used in the areas of checking, franking, sorting and postal delivery. The use of one-dimensional and/or two-dimensional bar codes in franking machines is necessary for that purpose, for clearly identifying the franking. However, they cannot be produced in machine-readable form with the inks which have been used in franking machines.

The properties required for ink jet printing cannot be optimally achieved with the previously known inks. Known inks either have excessively long penetration times; do not enjoy adequate penetration capability, for example such inks as are known from U.S. Pat. No. 5,106,416; or produce feathered prints of low contrast, for example such inks as are known from U.S. Pat. No. 5,630,867 and U.S. Pat. No. 5,674,314. A further example of a known ink is disclosed in U.S. Pat. No. 5,681,381 and U.S. Pat. No. 5,674,314.

SUMMARY OF THE INVENTION

An object of the invention was to provide an aqueous ink with good penetration capability, with which a high-contrast image of high resolution can be produced on a color or ink jet printer, without the characters suffering from feathering in the printing thereof. In particular an object of the invention was to provide an ink which is suitable for printing machine-readable characters and bar codes with a color or ink jet printer and which can also be used for franking machines.

That object is attained by an aqueous ink which contains one or more dyestuffs, at least one alkanol with a straight or branched $C_3$–$C_8$-alkyl chain and 2 to 4 hydroxyl groups, at least one $C_1$–$C_6$-alkyl ester of a -hydroxycarboxylic acid of the formula R—C(OH)—COOH, wherein R is H or a straight or branched $C_1$–$C_6$-alkyl residue and possibly further adjuvants, wherein the balance is water.

DETAILED DESCRIPTION OF THE PREFERRED EMBODIMENTS

Figure 1:
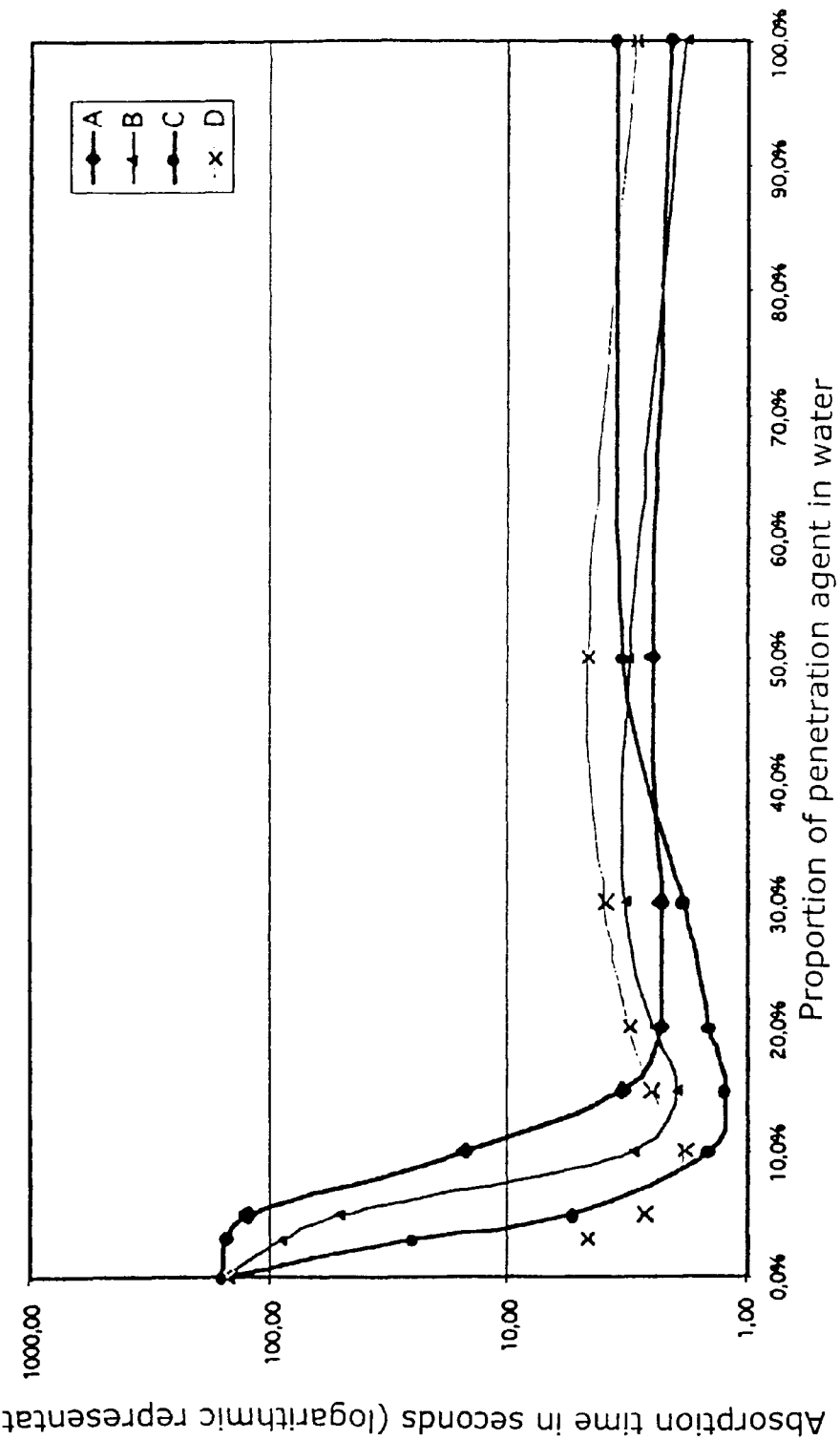
FIG. 1 is a graph plotting the penetration times for various penetration agents with $H_2O$.

It was surprisingly found that, by using a combination of an alkyl ester of an -hydroxycarboxylic acid and an alkanol with 3 to 8 C-atoms and 2 to 4 hydroxyl groups as the solvent mixture, it is possible to formulate an aqueous ink which penetrates very rapidly into paper and cardboard, which gives high-contrast characters with a high level of resolution but which at the same time substantially prevents severe running of the ink and feathering of the printed characters.

Those advantages are achieved by the combination according to the invention of the solvent constituents. As indicated above, in the formulation of aqueous inks it is important on the one hand that the penetration time or absorption time is short and on the other that sufficient dyestuff remains on the surface. For that purpose, there is a need for a given limit concentration in respect of penetration agent in order for example to cause pure water to penetrate completely into paper or cardboard in the shortest time. The most important part is played in that respect by the so-called wetting time. In principle a non-polar solvent wets the surface of the paper better than a polar solvent. As however the inks used should be aqueous for ecological and cost reasons, only water-soluble and thus polar solvents can be used. In that respect, a general fact is that a solvent is more water-soluble, the more polar it is and at the same time correspondingly less penetration-promoting.

A solvent system has now been found, with which both the absorption time and also the necessary contrast strength are in the required range. The explanation for this, although without being tied down to this explanation, is that the molecules of the solvents used, which are relatively large in contrast to water, penetrate into the paper more slowly, but exhibit a greater degree of affinity to the surface of the paper. Therefore, the surface of the paper is wetted more quickly than with pure water without an excessive amount of the dissolved dyestuff being sucked into the paper.

The basic solvent of the ink according to the invention is water which is a highly preferred solvent for cost and environmental reasons. It therefore forms the basis for the ink according to the invention.

The aqueous ink according to the invention further includes as essential constituents one or more polyvalent alkanols as high-boiling point solvents, one or more alkyl esters of an -hydroxycarboxylic acid as penetration agents, one or more dyestuffs and a tenside or surfactant and can possibly contain still further usual adjuvants such as a water-soluble polymer, buffer substances, biocidal agents, extenders and other constituent substances which are usual for inks.

In an embodiment of present the invention, the high-boiling point solvent used is a $C_3$–$C_8$-alkanol with 2 to 4 hydroxyl groups or a mixture of a plurality of alkanols. It was found that the use of such an alkanol, in comparison with ethyleneglycol which is used in known inks, with equally good absorption times, increases the contrast strength and reduces feathering of the printed characters. Preferably a $C_3$–$C_6$-alkanol with 2 or 3 hydroxyl groups is used as the alkanol. A particularly good balance between the speed of penetration and the limit concentration was achieved with pentane-1,5-diol, propane-1,2-diol, hexane-1,2,6-triol and glycerine or a mixture thereof. Insofar as other solvents have the same properties, namely provide for good dissolution or dispersion of the dyestuff and prevent excessive penetration of the dyestuff and feathering of the printed characters, they can be used in equivalent manner as a high-boiling point solvent.

In an embodiment of the invention an alkyl ester of a -hydroxycarboxylic acid or a mixture of a plurality of esters is used as the penetration agent. The alkyl ester component has 1 to 6 carbon atoms, preferably 1 to 3 carbon atoms, and can be branched or straight-chain. The -hydroxycarboxylic acid has a carbon structure or skeleton with 2 to 8 carbon atoms, preferably 2 to 4 carbon atoms, and is in particular D-, L- or D, L-lactic acid or glycolic acid. The print properties are greatly improved by use of the alkyl ester of -hydroxycarboxylic acid in accordance with the invention, in comparison with the previously known systems. This is due inter alia to the fact that the dyestuffs used for ink jet printing are generally less soluble in a hydroxycarboxylic acid esters than in glycol ethers, with the consequence that less dyestuff is transported due to the necessarily strong penetration effect into the paper and thus more dyestuff remains visible at the surface of the paper without however involving running of the ink or feathering of the characters. Those differences are due in particular to the arrangement, nature and amount of the polarity-influencing groups on the molecule.

The best results were achieved with alkyl lactates of which ethyl lactate is particularly preferably used. Although butyl lactate also exhibits highly advantageous properties in regard to penetration time and the production of clear printed images, it is less preferred as it has an unpleasant odor. Particularly preferred are (S)-(–)-methyl lactate, (S)-(–)ethyl lactate, (S)-(–)-propyl lactate, (S)-(–)-isopropyl lactate, (S)-(–)-n20butyl lactate, (S)-(–)-isobutyl lactate or a mixture thereof.

As ethyl lactate is available readily and in large amounts, it is particularly preferable, including also for cost reasons. Furthermore it has the advantage that it is biodegradable.

It was further found that the use of glycolic acid alkyl esters, in particular glycolic acid butyl ester, affords a high degree of resolution and a very slight feathering effect, in which respect however the penetration time is somewhat longer than in the case of the lactates. Preferably therefore glycolic acid alkyl esters are used in those ink systems in which a rapid penetration time is less important but on the other hand more importance is attached to a high degree of resolution and a minimum fiber staining or feathering effect.

The concentration of the penetration agent must be greater than or equal to the limit concentration which can be easily determined for a selected agent. The level of concentration should preferably be in such a range that absorption times for 100 pl±50 pl of ink of at most 2 seconds are achieved on commercially available envelope paper and cardboard.

As a further essential constituent the aqueous ink according to an embodiment of the present invention includes a dyestuff, in which respect the term dyestuff is also used to mean a blend of various dyestuffs in order to achieve a desired shade. The dyestuff can be a black dyestuff or a colored dyestuff. The dyestuff used in accordance with the invention or the combination of dyestuffs should afford a high level of contrast in the visible spectral range so that the printed characters or codes are easily readable both visually and also by machine. Black or colored dyestuffs or mixtures thereof which are well soluble in the solvents used in accordance with the invention and which are emulsifiable and soluble in water are preferably used. Black dyestuffs or mixtures which appear black in the printing or those colored dyes which are easily readable are preferably used. Examples that may be mentioned are cyan, blue, dark red and dark green. In particular, a dyestuff which is selected from the group consisting of basic, acid or substantive dyestuffs is used.

A black or a colored dyestuff is preferably used, or a dyestuff mixture which gives a black or a dark colored ink upon printing. Particularly preferred black dyestuffs which can be used for the aqueous ink according to the invention are Brilliant Black E.I. No 28440, Chromogen Black C.I. No 14645, Direct Deep Black E C.I. No 30235, Fast Black Salt B C.I. No 37245, Fast Black Salt K C.I. No 37190, Sudan Black HB C.I. No 26150, Naphthol Black C.I. No 20470, Bayscript® Black liquid, C.I. Basic Black 11, C.I. Basic Blue 154, Cartasol® Turquoise K-ZL liquid, Cartasol Turquoise K-RL liquid (C.I. Basic Blue 140), Cartasol Blue K5R liquid, Cartasol Brilliant Scarlet K4GL liquid or a combination of those dyestuffs. The dyestuff used for the ink according to the invention can also be a pigment. By way of example, the commercially available dyestuffs Hostafine® Black TS liquid (marketed by Clariant GmbH, Germany), Bayscript® Black liquid (C.I.-blend, marketed by Bayer AG, Germany), Cartasol® Black MG liquid (C.I. Basic Black 11, registered trademark for Clariant GmbH, Germany), Flexonyl Black PR 100 (Direct Deep Black E C.I. No 30235, marketed by Hoechst AG).

In addition the aqueous ink according to the invention contains a tenside or surfactant for adjusting the surface tension. The surfactant also contributes to penetration control. Consideration can be given to the surfactants which are usually employed for inks. As cationic or anionic surfactants, by virtue of their charged groups, can modify the properties of the dyestuff or the solution system, an amphoteric or non-ionic surfactant is preferably used. The use of specific anionic or cationic surfactants which do not modify the properties of the aqueous ink is however also a possibility and one of ordinary skill in the art can find suitable surfactants of that kind, by way of simple tests. Surfactants which are particularly suitable for the formulation of the aqueous ink according to the invention are amphoteric surfactants from the group consisting of betaines, ethoxylated diols, for example those from the Surfynol product series from Air-Products, Germany, or a mixture thereof.

A particularly preferred surfactant system with which particularly advantageous results were achieved is a mixture of N,[N-(N-2-hydroxyethyl-N-carboxyethylaminoethyl)-acetic acid amido]-N,N-dimethyl N-coconut ammonium betaine, 2,4,7,9-tetramethyldec-5-in-4,7-diol which is ethoxylated with 5–30 mols (for example which can be obtained from Air Products, Germany, from the Surfynol series), and the sodium salt of N-β-hydroxyethyl-N-carboxymethyl fatty acid amino ethylamine.

The surfactant is used in the amount which is usual for inks. It is preferably used in such an amount that the surface tension of the ink is in a range of between 15 and 60, preferably between 25 and 45 mN/m, as measured at 25° C.

An important property of the ink is its viscosity which may not be too low as otherwise the nozzle system has a tendency to spraying, whereby the contours become blurred, nor may it be too high as otherwise the ink cannot flow sufficiently quickly through the fine nozzles or capillaries. Inks with a kinematic viscosity in the range of between 2 and 12 mm$^2$/s, preferably between 4 and 9.5 mm$^2$/s, are well suited for ink jet printers. Preferably therefore the viscosity of the ink according to the invention is adjusted to be in that range. That is effected essentially by way of the amount of water used and it can also be effected by way of the addition of water-soluble polymers.

In addition to the above-mentioned constituents the aqueous ink according to the invention may additionally also optionally contain further adjuvants which improve or vary the properties of the ink. In particular water-soluble polymers, buffer substances, biocidal agents, extenders or other constituent substances which are usual for inks can be used as further adjuvants.

Thus usually the aqueous ink contains a water-soluble polymer which binds the dyestuff or a pigment on the surface of the paper. Here it is possible to use any water-soluble polymer which is suitable for inks for ink jet printing, as is contained in conventional ink formulations. A preferred water-soluble polymer is water-soluble starch, in particular with a mean molecular weight of between 3,000 and 7,000, polyvinyl pyrrolidone, in particular with a mean molecular weight of between 25,000 and 250,000, polyvinyl alcohol, in particular with a mean molecular weight of between 10,000 and 20,000, xanthan gum, carboxymethylcellulose, an ethylen oxide/propylene oxide block copolymer, in particular with a mean molecular weight of between 1,000 and 8,000, for example one from the Pluronic® product series from BASF AG, Germany, or a mixture of those polymers. The mean molecular weight of the water-soluble polymer should be at least 1000 and preferably, depending on the nature of the respective polymer selected, it should not be over 1 million, preferably not over 250,000.

In order to prevent microbial contamination of the aqueous ink which due to the relatively high water content is a good nutrient medium for microorganisms, a biocidal preservation agent can be added to the ink. Any preservation agent which is known for aqueous systems of this kind and which does not modify properties of the ink is suitable here. By way of example, a microbiocidal perservation agent based on 1,2-benzisothiazolin-3-one compounds, which is marketed under the name PROXEL® GXL by ICI has proven to be suitable. The biocidal preservation agent is used in the amounts which are usually employed, preferably in a range of between 500 and 3,000 ppm, with respect to the weight of the finished ink.

As the properties of the aqueous ink can vary with the pH-value, it is preferred for the ink to include a buffer system in order to buffer the pH value in the desired range. The pH-value of the ink can vary in a wide range of between 2.5 and 8.5 and is preferably in a range of between 5 and 8. In order to prevent corrosion of the parts of the printers which come into contact with the ink and in order not to have a negative influence on the material to be printed upon, the pH-value should be neither excessively acid, that is to say below 2, nor excessively basic, that is to say above 10.

For the purposes of buffering the desired range, the buffer systems which are usual in this field and which are usually employed for aqueous inks are appropriate. Suitable buffer systems should not cause any encrustation effects in relation to the nozzles due to crystal formation, they should not involve any reactions with the constituents of the ink, and in particular they should not involve any reactions which modify the dyestuff or result in encrustation of the nozzles, and, in the case of a bubble jet system, they should not form any encrustation of the heating dots by pyrolysis. In addition the buffer system should not materially alter the printing properties, for example the penetration properties, of the ink. In a preferred system the buffer system contributes to stabilizing the ink formulation. Lithium acetate, borate buffer, triethanolamine or acetic acid/sodium acetate can be mentioned as examples of buffer systems. The buffer is selected respectively depending on whether the dyestuff used is acid or basic. Particularly good results were achieved in the acid range with sodium acetate and acetic acid and in the basic range with triethanolamine. The buffer system is preferably used in a range of concentration of between 0.1 and 100% by weight.

In a preferred embodiment the aqueous ink according to the invention is of the following composition which has proven to be particularly advantageous: between 0.1 and 6% by weight of dyestuff or dyestuffs (with respect to the dry mass), between 15 and 55% of polyvalent alkanol or alkanols, between 1 and 250% by weight of alkyl ester of an -hydroxycarboxylic acid, between 0 and 5% by weight of water-soluble polymer, between 0 and 3,000 ppm of biocidal agent, between 0 and 10% by weight of buffer and between 30 and 60% by weight of water.

The physical parameters of the ink according to the invention can be adjusted in the usual manner which is known per se in relation to the respective printer to be used. When using a JetMail™ printer the following parameters have proven to be suitable: kinematic viscosity at 32° C. between 4.0 and 9.5 mm$^2$/s, surface tension between 25 and 45 mN/m, contact angle on paper of less than 45° and an absorption time of 100 pl±50 pl of ink of less than 2 s on commercially available envelope papers and cardboards.

The aqueous ink according to the invention has a high penetration capability and gives sharp printed characters with scarcely any feathering. They are therefore particularly well suited for printing machine-readable characters and bar codes.

A further subject of the present invention is therefore the use of an aqueous ink according to the present invention for printing machine-readable characters and bar codes.

The subject of the invention is further the use of the aqueous ink according to the invention for digitally printing franking machines, in particular those which are operated with ink jet printing technology, for example piezo and bubble jet processes.

Various embodiments of the present invention are detailed below.

EXAMPLE 1

The penetration times of 0.5 µl of penetration agent with water on paper and cardboard were tested. The following compositions were used:

A (between 0% and 100% of ethyl acetate, =ethyl lactate and water on difference to 100% water) reference paper B (between 0% and 100% of ethyl acetate, difference to 100% water) = ethyl lactate and water on cardboard C (between 0% and 10% of diethylene glycol monobutylether, difference to 100% water) comparison = diethylene glycol monobutyl ether and water on reference paper D (between 0% and 10% of diethylene, glycol monobutyl-ether, difference to 100% water) comparison = diethylene glycol monobutyl ether and water on cardboard The results can be seen from graph 1 shown in FIG. 1. It will be seen that the penetration times for mixtures of water and the penetration agent used in accordance with the invention are in the same range as those of the conventional penetration agents.

EXAMPLE 2

The penetration times (absorption times) of various mixtures of water, penetration agent and high-boiling point solvent were investigated. Two solvent mixtures with various proportions of penetration agent were tested on reference paper. The mixtures used were as follows:

A (comparison) = 50% of diethylene glycol and 1–20% of diethylene glycol monobutylether, difference to 100% water;

B (according to the invention) = 50% of pentane-1,5-diol and 1–20% of ethyl lactate and difference to 100% water.

Figure 2:
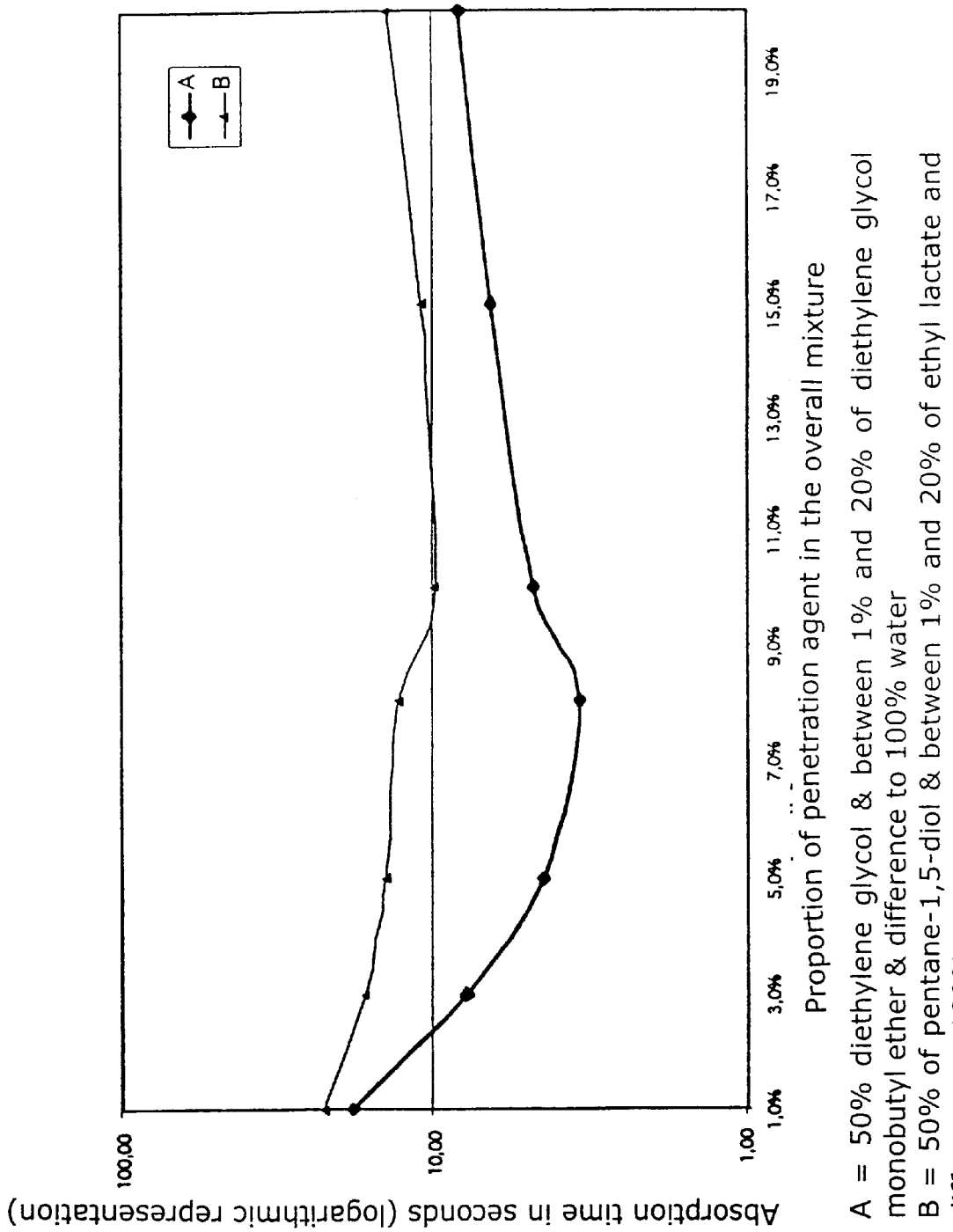
FIG. 2 is a graph recording the penetration times for mixtures of solvents with various proportions of penetration agent.

The results of this test are shown in graph 2 illustrated in FIG. 2. As will be seen therefrom the addition of the high-boiling point solvent admittedly reduces the limit concentration but it increases the penetration times of the composition.

EXAMPLE 3

The penetration times for various lactates in different proportions were tested. Pentane-1,5-diol was used as the high-boiling point solvent. The samples were tested on reference paper. The following compositions were used:

A=50% of pentane-1,5-diol, between 0 and 20% of methyl lactate, balance water

B=50% of pentane-1,5-diol, between 0 and 20% of ethyl lactate, balance water

C=50% of pentane-1,5-diol, between 0 and 20% of isopropyl lactate, balance water D=50% of pentane-1,5-diol, between 0 and 20% of n-butyl lactate, balance water.

Figure 3:
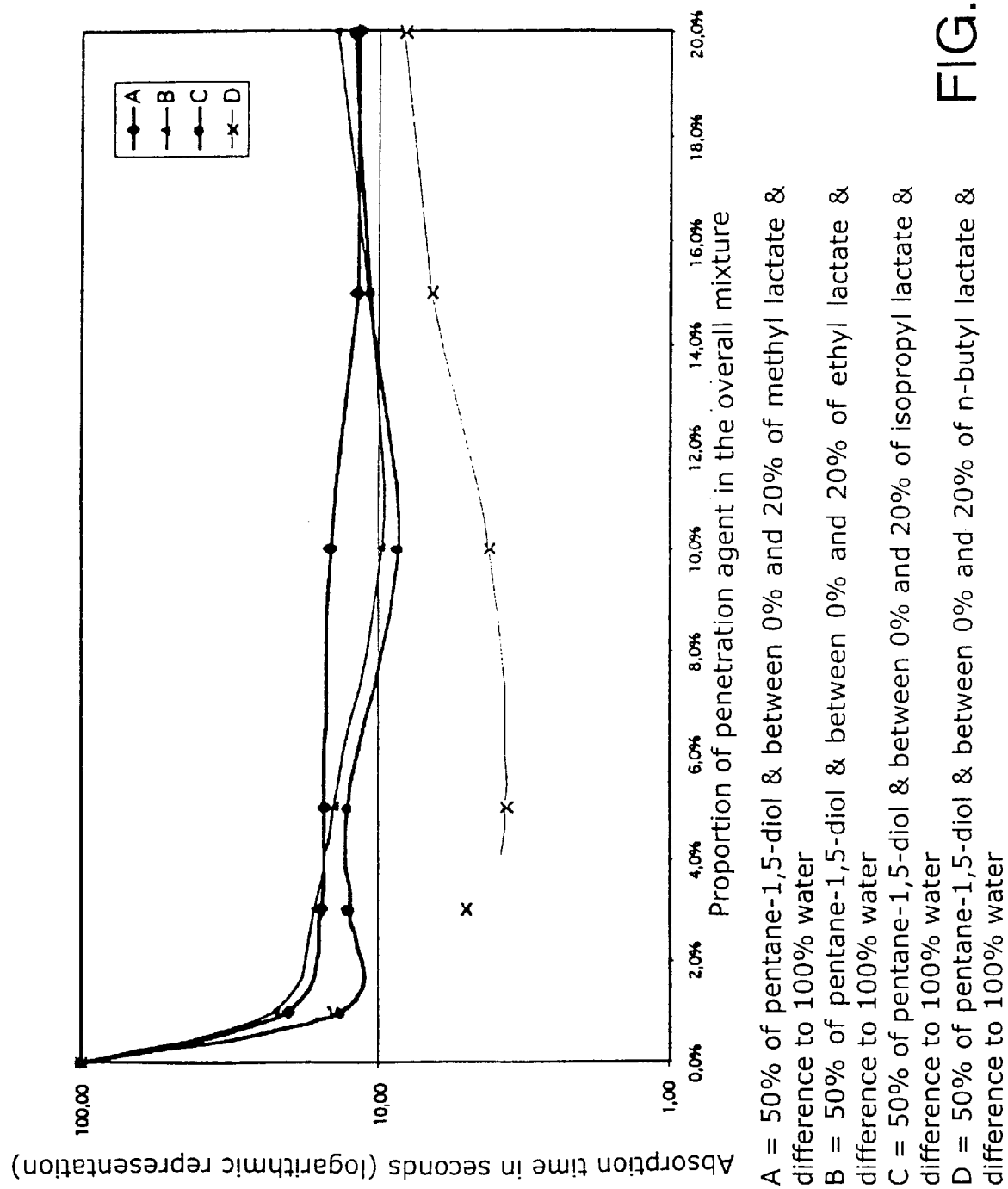
FIG. 3 is a graph showing the penetration times for pentane diol 30 with various proportions of penetration agent.

The results of the tests are to be found from graph 3 shown in FIG. 3.

The graph shows that all lactates tested are highly suitable as penetration agents, in which respect the fastest penetration times are achieved with n-butyl lactate. As however n-butyl lactate has an unpleasant odor, it is less preferred in comparison with the other lactates but, if the odor plays no part, it can equally well be used.

EXAMPLE 4

Figure 4:
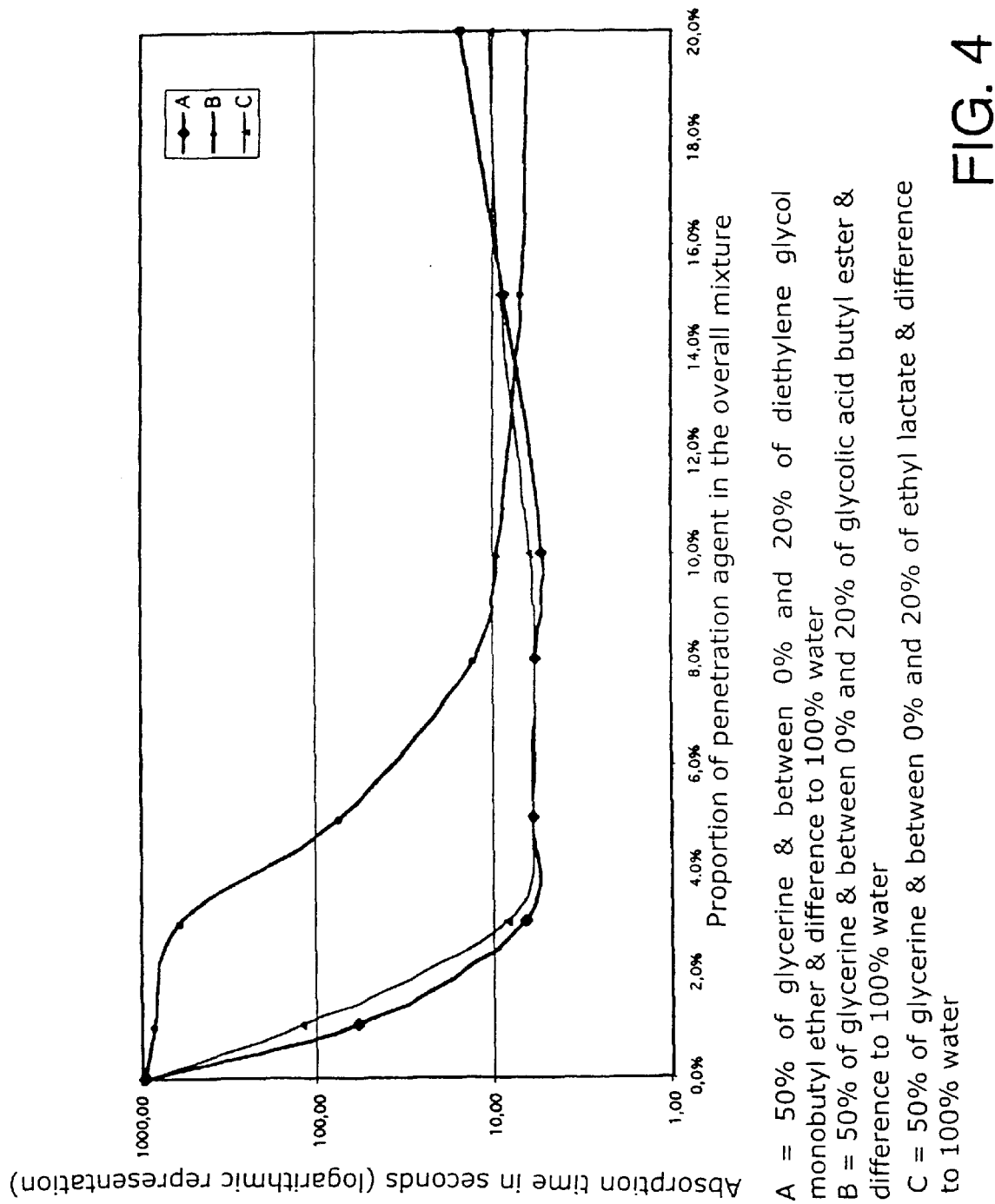
FIG. 4 is a graph showing the penetration times of mixtures of glycerine with various penetration agents.

In order to test the properties of other -hydroxycarboxylic acid esters as penetration agents, this Example involved comparing the use of glycolic acid butyl ester with the use of ethyl lactate. For that purpose the test was conducted in relation to the penetration times of 0.5 μl of the mixtures of glycerine and various proportions of penetration agent on reference paper. The following compositions were used:

A=50% glycerine, between 0 and 20% of diethylene glycol monobutylether, balance water B=50% glycerine, between 0 and 20% of glycolic acid butyl ester, balance water C=50% glycerine, between 0 and 20% of ethyl lactate, balance water The results are shown in graph 4 illustrated in FIG. 4. A glance at the graph shows that good penetration times can be achieved even with glycerine as the solvent. If however glycolic acid butyl ester is used as the penetration agent in the solvent system water/glycerine, it must be used in a larger amount in order to attain $t_{min}$. The glycolic acid butyl ester is therefore advantageously used in those ink systems in which the requirement is less for a fast penetration time than for a high level of resolution.

EXAMPLE 5

Various inks were formulated using ethyl lactate and the print quality of those inks in terms of feathering and resolution was investigated. At the same time, comparative compositions with diethylene glycol monobutylether were formulated, being the penetration agent used in the state of the art. The compositions are set out hereinafter and the printing results achieved are set forth in Table 1:

| Composition 1: | |
|---|---|
| Water | 28.90% by weight |
| Glycerine (87%) | 18.00% by weight |
| Propane-1,2-diol | 32.00% by weight |
| Ethyl lactate | 11.00% by weight |
| Hostafine ® Black TS liquid[1] | 100% by weight |
| PROXEL ®GXL[2] | 00.10% by weight |

[1]commercially available, produced by Clariant GmbH, Germany
[2]commercially available, produced by ICI.

The pH-value of this composition was 6.9, as measured at 25° C. The ink had a kinematic viscosity at 32° C. of 6.0 mm²/s. The surface tension was 37 mN/m at 25° C.

| Composition A (comparative example): | |
|---|---|
| Water | 30.90% by weight |
| Glycerine (87%) | 18% by weight |
| Propane-1,2-diol | 31.0% by weight |
| Diethyleneglycol monobutylether | 10.0% by weight |
| Hostafine ® Black TS liquid[1] | 10.0% by weight |
| PROXEL ®GXL[2] | 00.1% by weight |

[1]commercially available, produced by Clariant GmbH, Germany
[2]commercially available, produced by ICI.

The pH-value of this composition which was determined at 25° C. was 8.0. The kinematic viscosity was determined as being 6.6 mm²/s at 32° C. The surface tension was 35 mN/m at 25° C.

| Composition 2 (according to the invention): | |
|---|---|
| Water | 32.5% by weight |
| Glycerine (87%) | 20.5% by weight |
| Pentane-1,5-diol | 18.5% by weight |
| Ethyl lactate | 10.0% by weight |
| Bayscript ® Black liquid[1] | 13.5% by weight |
| Surfynol ® 485[2] | 00.4% by weight |
| Pluronic ® RPE 2520[3] | 04.0% by weight |
| PROXEL ®GXL[4] | 00.1% by weight |
| Triethanolamine | 00.5% by weight |

[1]commercially available, produced by Bayer AG
[2]commercially available, produced by Air-Products
[3]commercially available, produced by BASF
[4]commercially available, produced by ICI The kinematic viscosity of the ink at 32° C. was 6.7 mm²/s, the surface tension at 25° C. was 35 mN/m and the pH-value at 25° C. was 7.7.

| Composition B (comparative example): | |
|---|---|
| Water | 27.0% by weight |
| Glycerine (87%) | 20.5% by weight |
| Pentane-1,5-diol | 18.5% by weight |
| Diethylene glycol monobutylether | 15.0% by weight |
| Bayscript ® Black liquid[1] | 14.0% by weight |
| Surfonyl ®485[2] | 00.4% by weight |
| Pluronic ® RPE 2520[3] | 04.0% by weight |
| PROXEL ®GXL[4] | 00.1% by weight |
| Triethanolamine | 00.5% by weight |

[1]commercially available, produced by Bayer AG
[2]commercially available, produced by Air-Products
[3]commercially available, produced by BASF
[4]commercially available, produced by ICI The kinematic viscosity at 32° C. was determined as being 9.5 mm²/s, the pH-value was 8.2 at 25° C. and the surface tension at 25° C. was 35 mN/m.

| Composition 3 (according to an embodiment of the present invention | |
|---|---|
| Water | 31.4% by weight |
| Glycerine (87%) | 20.0% by weight |
| Pentane-1,5-diol | 21.5% by weight |
| Ethyl lactate | 10.0% by weight |
| Cartasol ® Black MG liquid[1] | 15.0% by weight |
| Pluronic ® RPE 2520[2] | 02.0% by weight |
| PROXEL ®GXL[3] | 00.1% by weight |

[1]commercially available, produced by Clariant GmbH, Germany
[2]commercially available, produced by BASF
[3]commercially available, produced by ICI The kinematic viscosity at 32° C. was 5.7 mm²/s, the surface tension (at 25° C.) was 36 mN/m, and the pH-value at 25° C. was 5.1.

| Composition 4 (according to the invention): | |
|---|---|
| Water | 12.7% by weight |
| Glycerine (87%) | 35.0% by weight |
| Pentane-1,5-diol | 13.8% by weight |
| Ethyl lactate | 15.00% by weight |
| Cartasol ® Turquoise K-ZL liquid* | 12.20% by weight |

-continued

Composition 4 (according to the invention):

| | |
|---|---|
| Cartasol ® Brilliant Scarlet K-4GL liquid* | 11.1% by weight |
| PROXEL ®GXL (ICI) | 00.2% by weight |

*commercially available, produced by Clariant GmbH, Germany

The kinematic viscosity at 32° C. was 6.6 mm²/s, the surface tension at 25° C. was 39 mN/m. The pH value which was determined at 25° C. was 3.5.

Composition C (comparative example):

| | |
|---|---|
| Water | 12.70% by weight |
| Glycerine (87%) | 35.00% by weight |
| Pentane-1,5-diol | 13.80% by weight |
| Diethylene glycol monobutylether | 15.0% by weight |
| Cartasol ® Turquoise K-ZL liquid* | 12.20% by weight |
| Cartasol ® Brilliant Scarlet K-4GL liquid* | 11.10% by weight |
| PROXEL ®GXL (ICI) | 00.20% by weight |

*commercially available, produced by Clariant GmbH, Germany

The kinematic viscosity at 32° C. was 8.2 mm²/s, the surface tension at 25° C. was 36 mN/m. The pH-value at 25° C. was 3.5. Printing tests were carried out with those ink compositions. For that purpose, the stated constituents were mixed and filtered through a 0.5 mm disposable filter in order to obtain an ink which can be used for ink jet printing. That ink was then used for printing on the printing system of the JetMail™ franking machine from Francotyp-Postalia AG, and the printing was investigated in terms of feathering, resolution capability and penetration capability. The results are set out in Table 1.

TABLE 1

| Ink | Absorption time 0.5 μl | Feathering | Resolution | PCS-value (E) Contrast |
|---|---|---|---|---|
| Composition 1 | 06 s | + | 2 | 0.84 |
| Composition A | 09 s | ○ | 4 | 0.83 |
| Composition 2 | 08 s | + | 2 | 0.88 |
| Composition B | 12 s | — | 4 | 0.85 |
| Composition 3 | 06 s | + | 2 | 0.85 |
| Composition 4 | 10 s | + | 1 | 0.84 |
| Composition C | 18 s | ○ | 4 | 0.8 |
| FP Post Red[1] | 07 s | — | 6 | n.v. |
| HP 51645 A[2] | 61 s | ++ | n.v. | n.v. |
| HP 51626 A[2] | 146 s | ++ | n.v. | n.v. |

[1]commercially available ink for the JetMail ™ printer from Francotyp-Postalia
[2]commercially available ink from Hewlett Packard The PCS-value (Print Contrast Signal) was measured with the Macbeth PCM II device with a diameter of 0.008 inch (measuring dot) and filter E (20 nm Band Pass Interference Filter 620–640 nm laser wavelength). The value is given as follows:

$PCS=(Rp-Ri)$=with $Ri$=Reflection Imprint and $Rp$=Reflection Background $Rp$

The absorption time is determined with a 0.5 μl capillary and can be calculated as the absorption time as follows:

The correct reference for calculation of the absorption time in the printer is afforded by the area coverage which is achieved in the printing operation and with the 0.5 μl capillary:

Capillary:
Dot diameter=4 mm; amount of ink=0.5 μl $$FbK = \frac{500,000 \text{ pl}}{(2 \text{ mm})^2 \cdot \pi} \text{ about } 40,000 \text{ pl/mm}^2$$

Printing:
Dot diameter (for 100% area coverage) at 192 dpi resolution=0.182 mm; amount of ink/drop=100 pl $$FbD = \frac{100 \text{ pl}}{(0.091 \text{ mm})^2 \cdot \pi} \text{ about } 3,800 \text{ pl/mm}^2$$

As an approximation the following relationship applies:

$(FbK/FbD)=(tK[s]/tD[s])$

Accordingly there then follows for an absorption time of 0.5 μl ink (tK) in the test absorption time in the printer (tD) of:

$$tD = \frac{[tK \cdot FbD]}{FbK} = \text{By way of example for } tK = 10 \text{ s, then } tD = 0.95 \text{ s}$$

Figure 5:
FIG. 5 is an original scan for assessing feathering.
Figure 5:
Figure 5:
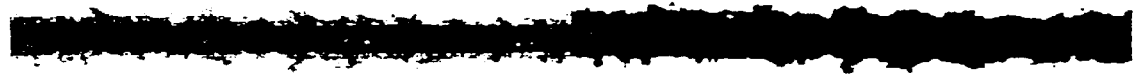
Figure 6:
FIG. 6 shows two reference prints for assessing resolution.
Figure 6:

Evaluation of feathering was effected on the basis of the assessment as is to be found in FIG. 5 (reference paper with 2,400 dpi scan at 8-fold magnification).

To assess resolution, a print-out was produced on an ink jet printer 5 on reference paper with a 1,200 dpi scan and double magnification, in which respect a resolution as shown in FIG. 5a was judged to be very good while a resolution as shown in FIG. 5b is unsatisfactory, that is to say not machine-readable.

As the results show the inks according to the invention afford 10 advantageous results both in terms of penetration time and also resolution and feathering The inks of the state of the art which were also tested for comparative purposes exhibit either a good penetration time but then a severe feathering effect or a very high penetration time if the feathering effect is slight. The invention therefore provides aqueous inks which afford an optimum combination of penetration time, resolution and feathering. It is also possible for the ink, besides the alkyl ester, to contain a proportion of up to 100%, preferably 5% of glycol ether. Overall in that respect the penetration agent may contain approximately up to 100% by weight of penetration agent.

Although modifications and changes may be suggested by those skilled in the art, it is the intention of the inventors to embody within the patent warranted hereon all changes and modifications as reasonably and properly come within the scope of their contribution to the art.

We claim as our invention:

1. A composition for an aqueous ink comprising:
   at least one dyestuff;
   at least one alkanol having a straight or branched $C_3$–$C_8$-alkyl chain and having at least one hydroxyl group;
   at least one $C_1$–$C_6$-alkyl ester of an α-hydroxycarboxylic acid having the formula R—C(OH)—COOH, wherein R is H or a straight or branched $C_1$–$C_6$-alkyl residue, as a penetration agent; and
   a balance of the composition comprising water.

2. A composition according to claim 1 wherein the composition further comprises a surfactant.

3. A composition according to claim 1 wherein the composition comprises up to 5% of glycol ether.

4. A composition according to claim 1 wherein at least one alkanol comprises a $C_3$–$C_6$-alkanol with two or three hydroxyl groups.

5. A composition according to claim 1 wherein at least one alkanol comprises propane-1,2-diol, pentane-1,5-diol, hexane-1,2,6-triol, glycerine or a mixture thereof.

6. A composition according to claim 1 wherein the penetration agent comprises a $C_1$–$C_3$-alkyl ester of an -hydroxycarboxylic acid.

7. A composition according to claim 1 wherein the penetration agent comprises an alkyl ester of glycolic acid, D-, L- or D,L-lactic acid.

8. A composition according to claim 1 wherein the composition comprises 0.1 to and 6% by dry weight of dyestuff, 5 to 55% of polyvalent alkanol, 1 to 25% by weight of alkyl ester of an -hydroxycarboxylic acid, 0 to 5% by weight of a water-soluble polymer, 0 to 3,000 ppm of a biocidal agent, 0 to 10% by weight of buffer, and 30 to 60% by weight of water.

9. A composition according to claim 1 wherein the penetration agent comprises (S)-(–)-methyl lactate, (S)-(–)-ethyl lactate, (S)-(–)-propyl lactate, (S)-(–)-isopropyl lactate, (S)-(–)-butyl lactate, (S)-(–)-isobutyl lactate, glycol ether or a mixture thereof.

10. A composition according to claim 1 wherein the dyestuff comprises a black dyestuff, a dark colored dyestuff or a mixture of dyestuffs which are black or dark in the print wherein each of the dyestuffs are soluble in organic solvents.

11. A composition according to claim 1 wherein the dyestuff is selected from the group consisting of basic, acid and substantive dyestuffs.

12. A composition according to claim 1 wherein the dyestuff comprises C.I. No 28440, C.I. No 14645, C.I. No 30235, C.I. No 37245, C.I. No 37190, C.I. No 26150, C.I. No 20470, C.I. Basic Black 11, C.I. Basic Blue 154, C.I. Basic Blue 140, a combination thereof, or a pigment.

13. A composition according to claim 1 wherein the composition comprises a plurality of adjuvants that are selected from the group consisting of water-soluble polymers, buffer, biocidal agents and extenders.

14. A composition according to claim 1 wherein the composition comprises a water-soluble polymer that has a mean molecular weight of at least 1,000.

15. A composition according to claim 14 wherein the water-soluble polymer is selected from the group consisting of a water-soluble starch having a mean molecular weight ranging from 3,000 to 7,000, a polyvinyl pyrrolidone having a mean molecular weight ranging from 25,000 to 250,000, a polyvinyl alcohol having a mean molecular weight ranging from 10,000 to 20,000, a xanthan gum, a carboxymethyl cellulose an ethylene oxide/propylene oxide block copolymer having a mean molecular weight ranging from 1,000 to 8,000, and a mixture thereof.

16. A composition according to claim 1 wherein the composition comprises a buffer that comprises triethanolamine, sodium acetate or acetic acid so as to chemically stabilize the composition.

17. A composition according to claim 1 wherein the composition comprises a surfactant that contains an amphoteric surfactant, a non-ionic surfactant, or a mixture thereof.

18. A franking machine comprising a printing unit that processes an ink for printing on postal items, the ink comprising a composition according to claim 1.

19. A postal material comprising an ink print that comprises an ink having a composition according to claim 1.

20. A method of ink jet printing comprising the steps of:

providing an aqueous ink composition comprising at least one dyestuff, at least one alkanol having a straight or branched $C_3$–$C_8$-alkyl chain and having at least one hydroxyl group, at least one $C_1$–$C_6$-alkyl ester of an a-hydroxycarboxylic acid having the formula R—C(OH)—COOH, wherein R is H or a straight or branched $C_1$–$C_6$-alkyl residue, as a penetration agent, and a balance of the composition comprising water; and ink jet printing the aqueous ink composition onto a substrate using ink jet technology.

21. A method for franking of postal items comprising the steps of:

providing an aqueous ink composition comprising at least one dyestuff, at least one alkanol having a straight or branched $C_3$–$C_8$-alkyl chain and having at least one hydroxyl group, at least one $C_1$–$C_6$-alkyl ester of an α-hydroxycarboxylic acid having the formula R—C(OH)—COOH, wherein R is H or a straight or branched $C_1$–$C_6$-alkyl residue, as a penetration agent, and a balance of the composition comprising water; and printing a franking imprint on the postal item with the composition aqueous ink composition.

* * * * *